(12) United States Patent
Ackerman et al.

(10) Patent No.: US 7,140,823 B2
(45) Date of Patent: Nov. 28, 2006

(54) CARGO BARRIER

(75) Inventors: David Ackerman, Dorchester (GB); Stephen Robert Carden, Bridport (GB)

(73) Assignee: Amsafe Bridport Limited, Dorset (GB)

( * ) Notice: Subject to any disclaimer, the term of this patent is extended or adjusted under 35 U.S.C. 154(b) by 1 day.

(21) Appl. No.: 10/490,179

(22) PCT Filed: Sep. 5, 2002

(86) PCT No.: PCT/GB02/04058

§ 371 (c)(1),
(2), (4) Date: Mar. 19, 2004

(87) PCT Pub. No.: WO03/024792

PCT Pub. Date: Mar. 27, 2003

(65) Prior Publication Data

US 2004/0240959 A1    Dec. 2, 2004

(30) Foreign Application Priority Data

Sep. 21, 2001    (GB) ................... 0122815.4

(51) Int. Cl.
*B61D 45/00*    (2006.01)

(52) U.S. Cl. .................................... 410/118
(58) Field of Classification Search .......... 410/96, 410/97, 117, 118, 129, 140; 296/24.3, 24.4, 296/24.43; 24/265 CD; 224/118.1, 137.1; 244/42.33, 42.34
See application file for complete search history.

(56) References Cited

U.S. PATENT DOCUMENTS

| | | | | |
|---|---|---|---|---|
| 2,669,402 A | * | 2/1954 | Del Mar | 410/118 |
| 3,294,034 A | * | 12/1966 | Bodenheimer et al. | 410/1 |
| 3,486,723 A | * | 12/1969 | Harrison | 410/118 |
| 5,069,109 A | * | 12/1991 | Lavan, Jr. | 89/1.11 |
| 5,186,587 A | * | 2/1993 | Moore | 410/118 |
| 5,253,913 A | * | 10/1993 | Metivier | 296/37.6 |
| 5,421,539 A | * | 6/1995 | Carducci | 244/118.1 |
| 5,443,586 A | | 8/1995 | Cargill | |
| 5,730,442 A | * | 3/1998 | Anderson | 273/400 |
| 5,820,187 A | * | 10/1998 | Ament et al. | 296/24.43 |
| 5,915,652 A | * | 6/1999 | Caldwell et al. | 244/121 |
| 6,010,286 A | * | 1/2000 | Cross et al. | 410/129 |
| 6,059,313 A | | 5/2000 | Coogan et al. | |
| 6,244,803 B1 | | 6/2001 | Parish et al. | |

(Continued)

FOREIGN PATENT DOCUMENTS

| | | |
|---|---|---|
| DE | 201 06 547 UI | 8/2001 |
| GB | 2 291 841 A | 2/1996 |
| WO | 200107797 * | 2/2001 |

*Primary Examiner*—H Gutman
(74) *Attorney, Agent, or Firm*—MacCord Mason PLLC

(57) ABSTRACT

A cargo barrier (9) in or for installation in an aircraft (2), the barrier (9) comprising a peripheral frame structure (10) of rigid material and a cargo restraining net (11), the frame structure (10) being, in the aircraft (2), attached to attachment points on the interior structure of the aircraft and the net being attached to attachment points (12) on the frame structure (10). The frame structure (10) and net (11), in use, form a barrier across an interior space of the aircraft (2) in order to restrain longitudinal movement of cargo within the aircraft (2).

18 Claims, 5 Drawing Sheets

U.S. PATENT DOCUMENTS

| | | | |
|---|---|---|---|
| 6,435,786 B1 * | 8/2002 | Breckel et al. | 410/118 |
| 6,460,912 B1 * | 10/2002 | Moore et al. | 296/24.43 |
| 6,543,975 B1 * | 4/2003 | Kopperud | 410/118 |
| 6,557,928 B1 * | 5/2003 | Dreher et al. | 296/180.1 |
| 6,616,389 B1 * | 9/2003 | Ament et al. | 410/118 |
| 6,969,185 B1 * | 11/2005 | Adair | 362/542 |

* cited by examiner

CARGO BARRIER

BACKGROUND OF THE INVENTION

The present invention relates to a cargo barrier in or for installation in an aircraft.

A conventional design of cargo barrier for the restraint of cargo on the main deck of a freighter or combi aircraft comprises a net attached to attachment points on the interior structure of the aircraft. However, this type of design can often be compromised by restrictive radial load limits set by the airframe manufacturer and applied to the attachment points on the aircraft structure. This problem is aggravated when the maximum permissible longitudinal distension of the net is low, as a net that has a lower distension at higher loads results in greater radial loading at the attachment points. In addition, the location of the attachments provided by the airframe manufacturer may not necessarily be in the best positions for a symmetrical and efficient net design.

A common alternative to the use of a net barrier is the use of a rigid barrier, or bulkhead. Such a barrier will restrain the movement of cargo without being significantly distended or causing high radial loading of the attachment points. However, rigid barriers are heavier, more expensive and lack the operational flexibility of a net.

SUMMARY OF THE INVENTION

According to the present invention, a cargo barrier in or for installation in an aircraft comprises a peripheral frame structure of rigid material and a cargo restraining net, the frame structure being, in the aircraft, attached to attachment points on the interior structure of the aircraft and the net being attached to attachment points on the frame structure, the frame structure and net, in use, forming a barrier across an interior space of the aircraft in order to restrain longitudinal movement of cargo within the aircraft.

The combination of net and rigid frame structure barrier disclosed in the present application has the advantages of lower weight, lower cost and increased operational flexibility over rigid bulkhead type barriers. At the same time, the use of such a barrier results in reduced radial loading on the aircraft attachment points when compared to the use of known net barriers, because the radial loading caused by distension of the net is first applied to a frame structure which alleviates this load. The use of a peripheral frame structure also provides the advantage that net attachments can be placed in the most effective positions for an efficient net design.

The frame structure may comprise separate sections which interconnect to form the frame structure, such an arrangement facilitating installation of the barrier inside the aircraft. Preferably hollow box sections are used which can provide resistance to twisting of the structure without an excessive weight penalty.

The interior space may be the upper deck of the aircraft between a deck floor and the interior of the upper fuselage.

The frame structure may be shaped to form a close fit with the fuselage and deck at the location of attachment and may in use be sealed therebetween and have a smoke barrier incorporated with the net.

The frame structure may be shaped to form, at the location of attachment, a close fit with the interior of the upper fuselage and extend below the deck floor.

At least part of the frame structure may be arcuate, as viewed from the face of the barrier, in order to better resist radial loading caused by distension of the cargo net.

The net may comprise materials that have a low extension at breaking point such as metallic cables or plastics fibre cables (such as aramid fibre cables). Such a barrier allows undesirable longitudinal distension of the net to be reduced, while still providing the aircraft attachment points with protection from the increase in radial loading that the use of such low extension materials inevitably causes.

BRIEF DESCRIPTION OF THE DRAWINGS

An embodiment of the invention will now be described, by way of example, with reference to the accompanying, diagrammatic and not to scale, drawings, in which.

DETAILED DESCRIPTION OF EMBODIMENTS

Figure 1:
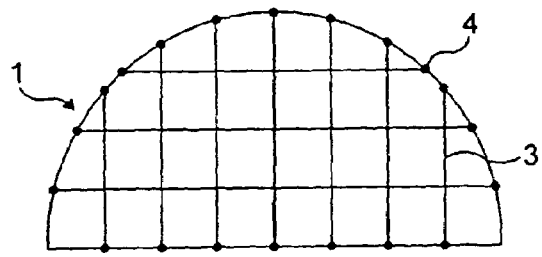
FIG. 1 is a transverse cross section of an aircraft upper deck cargo area showing an installed net barrier, as known in the art.
Figure 2:
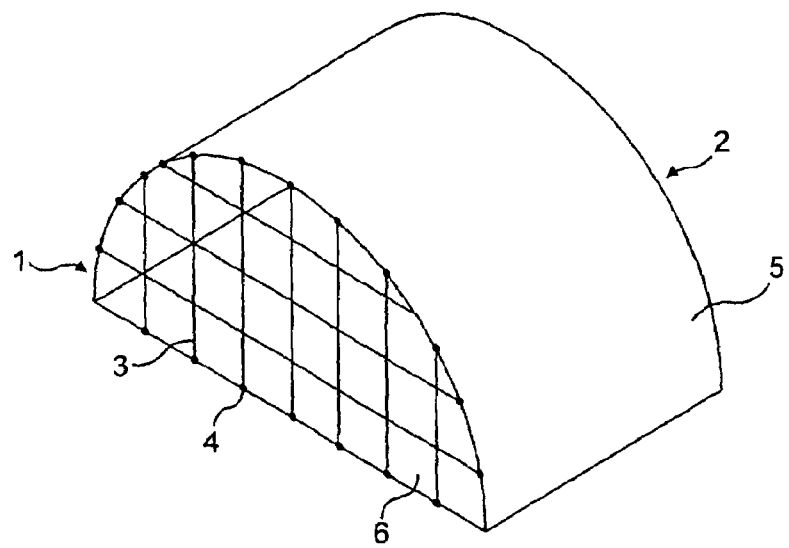
FIG. 2 is a perspective view of a portion of an aircraft upper deck including the cross section of FIG. 1.

FIGS. 1 and 2 show a known net barrier 1 for restraining longitudinal movement of cargo within an upper deck cargo area of an aircraft 2, the barrier comprising a net 3 directly attached to attachment points 4 on the fuselage 5 of the aircraft 2 and floor 6 of the upper deck.

Figure 3:
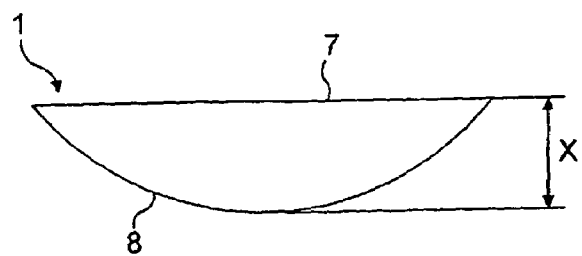
FIG. 3 is a plan cross section of the net barrier of FIG. 1 showing distension of the barrier under load.

If longitudinal cargo movement occurs with this known net barrier, loading of the net barrier 1 results and the net barrier 1 distends from its normal position 7 to a longitudinally distended position 8 by a distance X, as shown in FIG. 3 This distension results in a force with a radial component being applied to the net fixing points.

Figure 4:
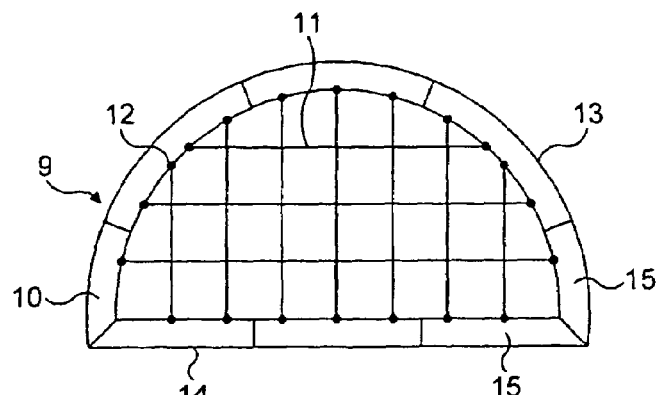
FIG. 4 is a transverse cross section of an aircraft upper deck showing an installed cargo barrier according to the present invention.
Figure 5:
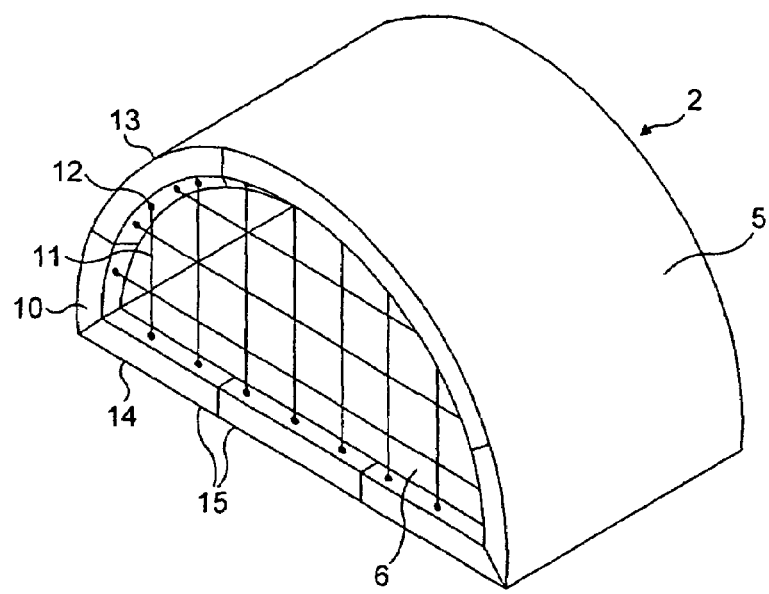
FIG. 5 is a perspective view of a portion of an aircraft upper deck including the cross section of FIG. 4.

As shown in FIGS. 4 and 5, a cargo barrier 9 comprises a peripheral frame structure 10 made of rigid material and a cargo restraining net 11. The net 11 is attached to attachment points 12 on the frame structure 10, and the frame structure 10 is attached to attachment points (not shown) on the fuselage 5 of the aircraft 2 and floor 6 of the upper deck. In the drawings, a single outer curved line represents both the fuselage 5 of the aircraft 2 and the outer edge of the structure 10, indicating the close fit between the frame and the fuselage.

In the embodiment shown in FIGS. 4 and 5, the frame structure 10 comprises a partially circular member 13, which follows the inner contour of the fuselage 5 around the upper deck cargo area, and a floor level member 14, which extends across the floor 6 and links the ends of member 13. The frame 10 can be attached to the aircraft 2 at the desired longitudinal location using either attachment points provided for attachment of a conventional net barrier 1 (when converting from an existing barrier to a low extension version) or purpose made connections (which may be preferable for new installations). Optionally, the frame 10 may be connected to the aircraft 2 via drag straps 31, (which may be made of textile/flexible or rigid material) to allow longitudinal displacement of the barrier from the aircraft attachment points provided by the aircraft manufacturer.

If desired, the frame structure 10 can be sealed against the existing inner fuselage surfaces and floor panels of the aircraft in order to provide a smoke-proof seal when a smoke barrier (not shown) is incorporated alongside the net.

The frame structure 10 should have a high resistance to twisting, in order to avoid imposing high radial loads to the airframe as a result of the couple generated by the difference between the loading and the restraint planes. Preferably this is achieved by utilizing frame structure members 13, 14 of hollow box structure, though where the members are curved it is likely that they will be formed as a fabrication, rather than an extruded section.

Preferably the members 13, 14 will be made in sections 15 in order to facilitate installation of the frame structure in the aircraft. If the layout of the frame structure is as shown in FIGS. 4 and 5, at least five sections are likely to be necessary around the fuselage and three on the floor, in order to keep the size of each section manageable and to facilitate removal when access to the aircraft liners and the systems or structure behind a section is required.

The attachment points 12 for the net 11 are located around the inner periphery of the frame structure 10. Separating the net attachments 12 from the aircraft structure gives the potential to have adjustable or alternative positions for them. This may be useful for accommodating different and potentially more effective net layouts for different cargoes with a minimum of engineering intervention. For example, it would be possible to increase the number of net attachments combined with a greater number of closer pitch, lighter duty, net members, thus spreading the load more evenly into the frame.

Figure 6:
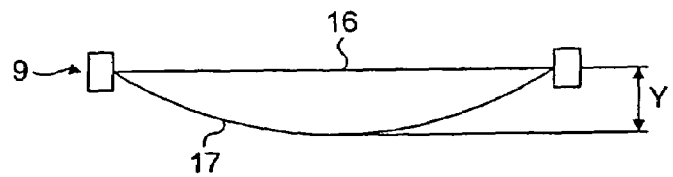
FIG. 6 is a plan cross section of the cargo barrier of FIG. 4 showing distension of the net under load.

Referring now to FIG. 6 loading of the cargo barrier 9 causes the net 11 to distend from its normal position 16 to a longitudinally distended position 17 by a distance Y.

If low longitudinal distension Y of the net 11 is required, there are various ways this can be achieved. One is to use greater quantities of a conventional, normal extension material so that the net is working at low stress levels and, hence, near the lower end of its stress-strain curve. However, this tends to lead to a more heavy and bulky net. Preferably therefore, the net incorporates low extension materials, in particular, cables 21, which may be metallic cables or plastics fibre cables (such as aramid fibre cables), in order to reduce longitudinal distension of the net under load to a level significantly less than that achieved by a conventional net.

The net 11 may be formed as matrix of vertical and horizontal members, as shown in FIGS. 4 and 5, or as a series of radial and circumferential members formed into a "spider" net. It is likely to be normal in appearance, but variations can include combinations of conventional and low extension net materials. To facilitate access past the net, it can be equipped with a number of quick-release attachment fittings 61 down each side and possibly across at least part of the floor so that it may be partially disconnected from the frame.

The size of frame required, in order to react or alleviate the radial loads expected, can be calculated as set out below. The calculations are based on a Boeing (RTM) B737-700C aircraft and a cargo barrier as shown in FIGS. 4 and 5 having hollow box structure members and an Airbus (RTM) A300 aircraft and a cargo barrier as shown in FIGS. 4 and 5 having hollow box structure members.

B737-700C

The existing cargo barriers in a B737-700C have a perimeter of 400.489 inches and are designed to take a forward load of 405000 lbf, giving a load share of 1011.26 lbf per inch run. Although the aircraft has a total of 24 fuselage attachments giving an average spacing of 16.69 inches, the actual spacing of fuselage attachments can be as much as 24 inches, so the required frame structure member size must be calculated from this worst case scenario; 1011.26 lbf per inch run gives a total load to be transmitted of 24270 lbf over a 24 inch stretch. The worst situation would be the application of this load on a member through a single net attachment (Point Load) mid way between fuselage attachments and the best would be a uniformly distributed load (UDL) through multiple net attachments—in reality the situation will be somewhere between the two.

The required member modulus is based on $I/y=M/\sigma$, where I is the moment of inertia, y is the distance from a neutral axis to an extreme point, M is the maximum bending moment (WL/8 for a Point Load and WL/12 for a UDL where WL is the bending moment) and $\sigma$ is the tensile strength of the material selected (for the purposes of this example, a value of 6005 aluminium alloy of 265 N/mm$^2$ (38435 lbf/in$^2$) has been assumed).

Based on the details above, and if one assumes that the net adopts a deflected shape that is circular in profile (it is appreciated that in practice the net is highly unlikely to assume a circular profile on loading—however the profile actually adopted usually leads to lower radial loads such that, for the purposes of the present analysis which is interested in orders of magnitude, this assumption is acceptable), the following table of deflection angles ($\theta$), resultant loads, radial loads and member moduli (based on radial load only) for a range of net deflections is obtained ($\theta$ being the angle between the pre-deflected net and the deflected net, taken at the point of attachment to the frame structure).

TABLE 1

| Displacement (Ins) | $\theta°$ | Resultant (R = 24270/ Sin $\theta°$ lbf) | Radial Load (Y = 24270/ Tan $\theta°$ lbf) | I/y (Point Load) $\dfrac{WL}{8\sigma}$ in$^3$ | I/y (UDL) $\dfrac{WL}{12\sigma}$ in$^3$ |
| --- | --- | --- | --- | --- | --- |
| 6 | 10.16 | 137587 | 135429 | 10.571 | 7.047 |
| 8 | 13.52 | 103813 | 100937 | 7.878 | 5.252 |
| 10 | 16.85 | 83728 | 80133 | 6.255 | 4.170 |
| 12 | 20.16 | 70421 | 66106 | 5.160 | 3.440 |
| 18 | 29.85 | 48761 | 42292 | 3.301 | 2.201 |
| 24 | 39.15 | 38441 | 29811 | 2.327 | 1.551 |
| 30 | 47.61 | 32861 | 22154 | 1.729 | 1.153 |
| 36 | 56.14 | 29227 | 16284 | 1.271 | 0.847 |

For a box section of outer dimensions B×D and inner dimensions b×d, the moment of inertia about a neutral axis $I_{NA}=(BD^3/12)-(bd^3/12)$ and $y=D/2$.

With a member cross section of four inches square with a one-quarter inch wall thickness, the I/y=4.414 in$^3$. This would allows the frame structure to react the loads incurred by a net displacement of 12 inches. This size of section has a cross-sectional area of 3.75 inches$^2$ which, for the 400.489 inch perimeter, leads to a volume of 1501.84 inches$^3$. Made from 6005 aluminium alloy of density 2.71 g/cm$^3$ (0.0979 lb/in$^3$), such a frame structure would weigh 147.03 lb ($\approx$67 kg).

A300

The existing cargo barriers in an A300 have a perimeter of about 540 inches and are designed to take a forward load of 993315 lbf, giving a load share of 1839.47 lbf per inch run. The spacing of fuselage attachments is 18 inches, on average, but can be as high as 20.28 inches* between attachments 14 and 15 (*There is one position at the sidewall/floor intersection between fittings 21 and 22 with a higher gap of 27.94 inches, but this would be treated separately). Over 20.28 inches the load will be 37304.5 lbf. As before, the following table is based on the I/y value for the two extremes of a point load at mid-span (Point Load) and a uniformly distributed load (UDL), and also on the same material, 6005 Al alloy of 265 N/mm² (38435 lbf/in²).

TABLE 2

| Displacement (Ins) | θ° | Resultant (R = 37304.5/ Sin θ lbf) | Radial Load (Y = 37304.5/ Tan θ lbf) | I/y (Point Load) $\frac{WL}{8\sigma}$ in³ | I/y (UDL) $\frac{WL}{12\sigma}$ in³ |
|---|---|---|---|---|---|
| 6 | 6.7 | 319742 | 317558 | 20.945 | 13.963 |
| 8 | 8.9 | 241125 | 238222 | 15.712 | 10.475 |
| 10 | 11.1 | 193767 | 190143 | 12.541 | 8.361 |
| 12 | 13.3 | 162158 | 157809 | 10.408 | 6.939 |
| 15 | 16.6 | 130578 | 125135 | 8.253 | 5.502 |
| 18 | 19.9 | 109597 | 103053 | 6.797 | 4.531 |
| 24 | 26.3 | 84195 | 75480 | 4.978 | 3.319 |
| 30 | 32.6 | 69240 | 58331 | 3.847 | 2.565 |
| 36 | 38.6 | 59794 | 46731 | 3.082 | 2.055 |

Thus, with a frame section of four inches square with a one-quarter inch wall thickness, I/y=4.414 in³. This will allow for an extension of around 24 inches. The weight would increase in proportion to the circumference, so would increase to (540/400)×147=198 lb (≈90 kg).

Figure 7:
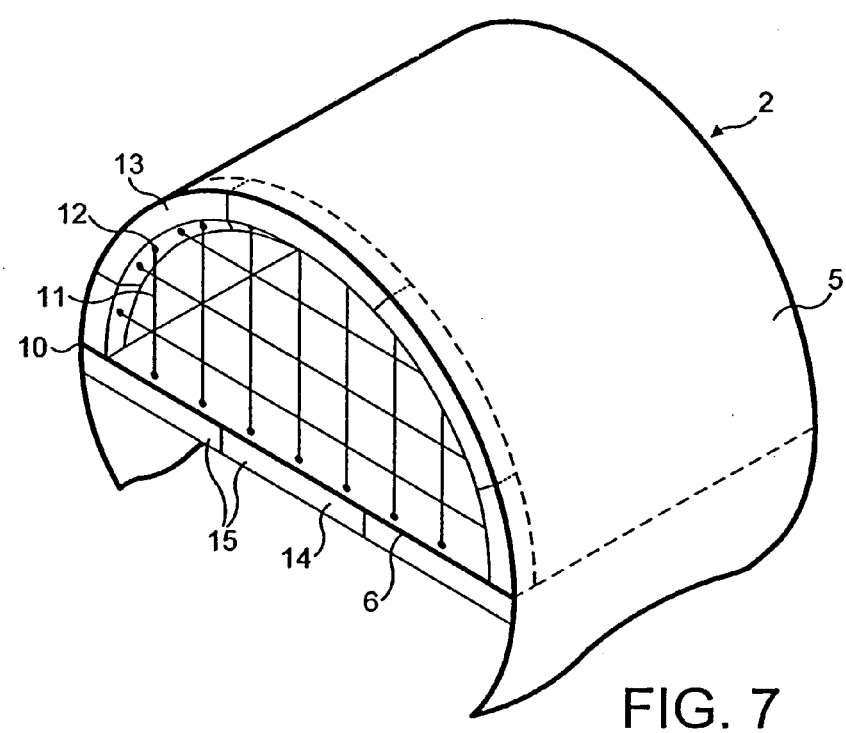
FIG. 7 is a perspective view of a portion of an aircraft upper deck.
Figure 8:
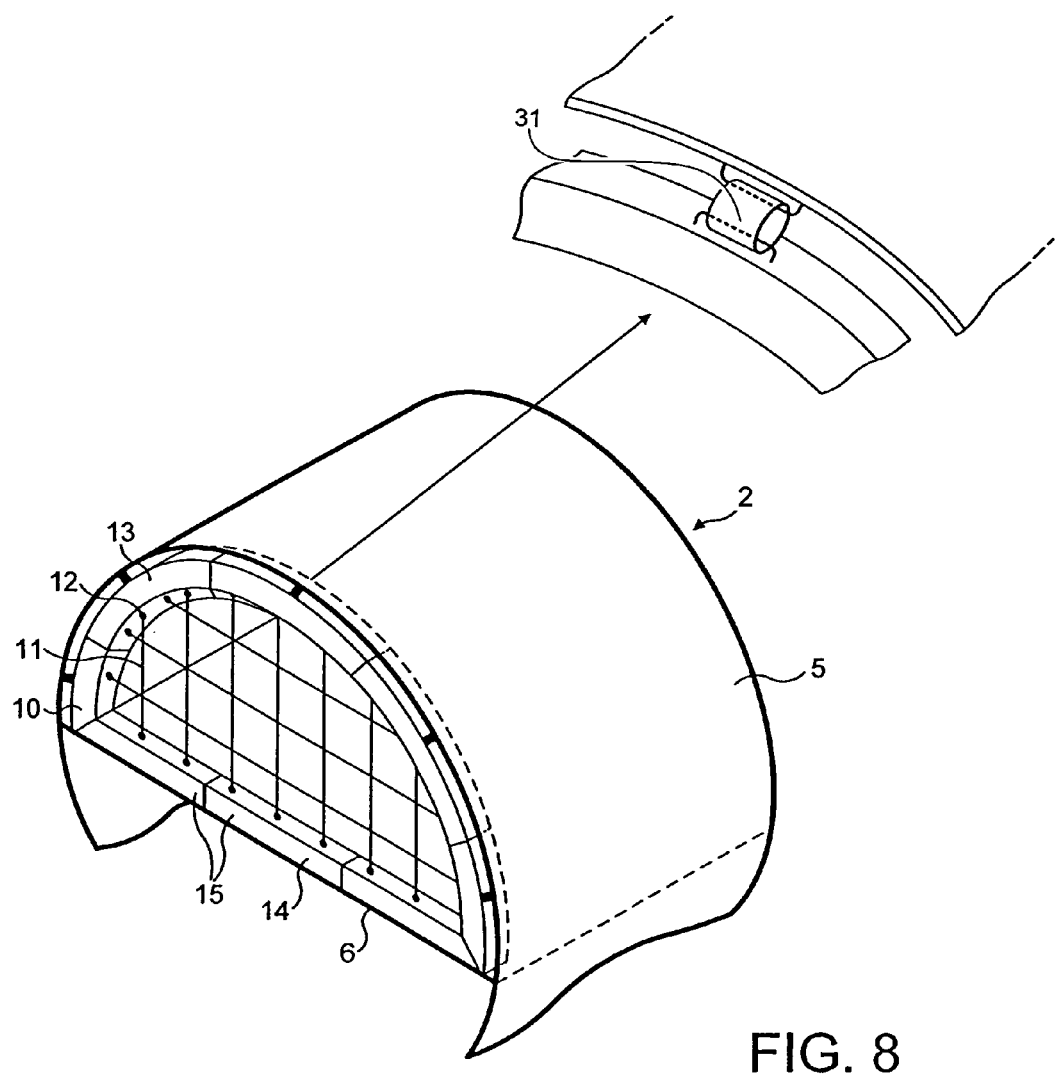
FIG. 8 is a perspective view of a portion of an aircraft upper deck cargo area including an installed net barrier and an exploded view of a connection to the aircraft.
Figure 9:
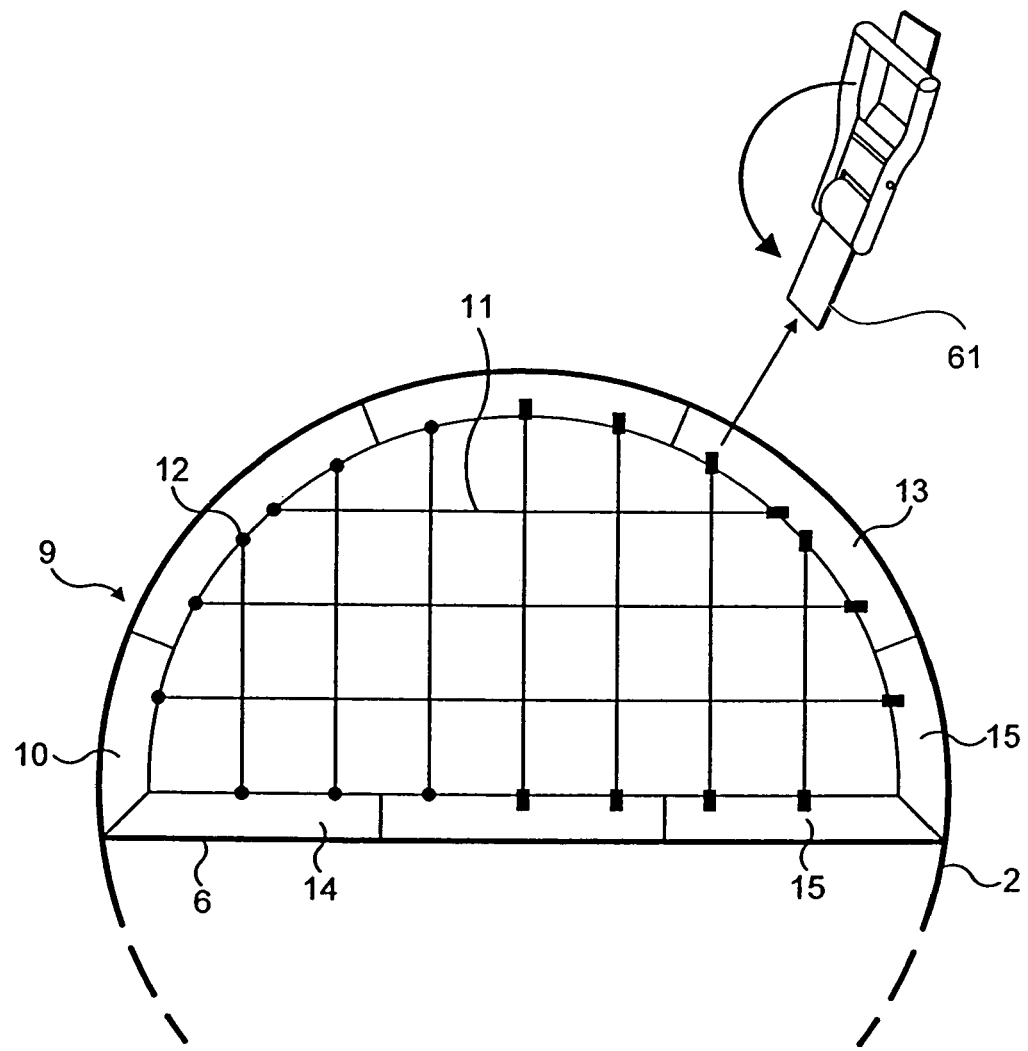
FIG. 9 is a transverse cross section of an aircraft upper deck cargo area showing an installed net barrier including an exploded view of a quick release attachment fitting.

Although FIGS. 4 and 5 show one particular design for the frame structure, other layouts would also be suitable. For example, as shown in FIG. 7, the floor level member 14 could be positioned below the floor surface level 6, with due consideration for any aircraft systems that may be in that area, in order to reduce the impediment to a clear passage for personnel on the main deck. Alternatively, instead of having a floor level beam the frame structure could be designed as a completely circular member in order to take advantage of the more efficient shape, depending on the degree of access to the underfloor area, space available and structure of the particular aircraft concerned.

Although the above example describes frame structure members 13, 14 which are hollow box sections, they could instead be of different shapes, for example circular.

The invention claimed is:

1. A cargo barrier in a fuselage of an aircraft, the fuselage having an inner contour, there being a floor in the fuselage, and the barrier comprising a peripheral frame structure of rigid material and a cargo restraining net, the peripheral frame structure being attached at a plurality of attachment points spaced around its perimeter to frame attachment points on the floor and along the inner contour of the fuselage of the aircraft and the net being attached to net attachment points on the frame structure, the frame structure and net extending across an interior space of the aircraft in order to restrain longitudinal movement of cargo within the aircraft, wherein the frame structure comprises separate sections which interconnect to form the frame structure.

2. A cargo barrier according to claim 1, wherein the interior space is that formed between an upper surface of the fuselage and a deck of the aircraft.

3. A cargo barrier according to claim 2, wherein the frame structure is shaped to form a close fit with the upper surface of the fuselage and the deck.

4. A cargo barrier according to claim 3, wherein the frame structure is sealed to the fuselage and deck leaving no gaps between them and the frame.

5. A cargo barrier according to claim 2, wherein the frame structure is shaped to form a close fit with the upper surface of the fuselage and extends below the deck.

6. A cargo barrier according to claim 1, wherein the net incorporates metallic cables or plastics fibre cables.

7. A cargo barrier according to claim 1, wherein drag strips are provided for fixation between the frame structure and the frame attachment points to allow longitudinal displacement of the barrier from the location of the frame attachment points.

8. A cargo barrier according to claim 1, wherein the frame structure is made of hollow section members.

9. A cargo barrier according to claim 1, wherein the net is attached to the frame by quick-release fixings.

10. A cargo barrier in an aircraft of the type having a deck mounted in a tubular fuselage to provide a cargo area within the fuselage above the deck, the barrier comprising a peripheral frame structure of rigid material and a cargo restraining net, the frame structure having a plurality of attachment points spaced apart along its top attached to frame attachment points on the interior structure of the fuselage and a plurality of attachment points spaced apart along its bottom attached to frame attachment points on the deck of the aircraft and the net attached to net attachment points on the frame structure, the frame structure and net extending across an interior space of the aircraft in order to restrain longitudinal movement of cargo within the aircraft.

11. The cargo barrier of claim 10 wherein the peripheral frame structure includes an arcuate edge substantially identical to an arcuate portion of the interior of the aircraft.

12. The cargo baffler according to claim 10 wherein the cargo restraining net extends in a substantially planar configuration between all of the frame attachment points on the frame structure.

13. The cargo barrier according to claim 10 wherein the net incorporates metallic cables.

14. The cargo barrier according to claim 10 wherein the net incorporates plastic fibre cables.

15. A cargo barrier in an aircraft having a tube-shaped fuselage and a deck in the fuselage forming a cargo area above the deck, the barrier comprising a peripheral frame structure of rigid material and a cargo restraining net the frame structure having a contoured top portion substantially mating with an inside of the tube-shaped fuselage, a fuselage attachment point on the contoured top portion attaching the top portion of the frame structure to the fuselage to distribute a portion of a load applied to the structure to the aircraft fuselage and a bottom portion substantially mating with the deck having a deck attachment point attaching the bottom portion of the frame structure to the deck, the net attached to net attachment points on the frame structure, the frame structure and net for restraining longitudinal movement of cargo within the aircraft.

16. The cargo barrier according to claim 15, wherein the top portion is connected to a substantially linear bottom.

17. A cargo barrier according to claim 15, wherein drag strips are provided for fixation between the frame structure and the aircraft to allow longitudinal displacement of the barrier.

18. The cargo baffler according to claim 15 wherein the net incorporates metallic or plastic fibre cables.

* * * * *

UNITED STATES PATENT AND TRADEMARK OFFICE
CERTIFICATE OF CORRECTION

| | | |
|---|---|---|
| PATENT NO. | : 7,140,823 B2 | Page 1 of 1 |
| APPLICATION NO. | : 10/490179 | |
| DATED | : November 28, 2005 | |
| INVENTOR(S) | : Ackerman et al. | |

It is certified that error appears in the above-identified patent and that said Letters Patent is hereby corrected as shown below:

Title Page #75
John William Startup, Crewkerne (GB) should be listed as an inventor on the face of the patent.

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,140,823 B2 |
| APPLICATION NO. | : 10/490179 |
| DATED | : November 28, 2006 |
| INVENTOR(S) | : Ackerman et al. |

It is certified that error appears in the above-identified patent and that said Letters Patent is hereby corrected as shown below:

Title Page #75
John William Startup, Crewkerne (GB) should be listed as an inventor on the face of the patent.

This certificate supersedes Certificate of Correction issued February 6, 2007.

Signed and Sealed this

Sixth Day of March, 2007

JON W. DUDAS
*Director of the United States Patent and Trademark Office*